(12) United States Patent
Medina et al.

(10) Patent No.: US 11,890,931 B2
(45) Date of Patent: Feb. 6, 2024

(54) SUSPENSION POWER ELECTRIC GENERATOR

(71) Applicants: Luis Marcial Medina, New Port Richey, FL (US); Margaret Julian, New Port Richey, FL (US); Roaa Qandeel, New Port Richey, FL (US)

(72) Inventors: Luis Marcial Medina, New Port Richey, FL (US); Margaret Julian, New Port Richey, FL (US); Roaa Qandeel, New Port Richey, FL (US)

( * ) Notice: Subject to any disclaimer, the term of this patent is extended or adjusted under 35 U.S.C. 154(b) by 268 days.

(21) Appl. No.: 17/591,131

(22) Filed: Feb. 2, 2022

(65) Prior Publication Data

US 2023/0241969 A1 Aug. 3, 2023

Related U.S. Application Data

(60) Provisional application No. 63/258,324, filed on Apr. 27, 2021.

(51) Int. Cl.
| | | |
|---|---|---|
| *B60K 25/10* | (2006.01) | |
| *B60L 50/30* | (2019.01) | |
| *B60G 17/015* | (2006.01) | |

(52) U.S. Cl.
CPC .......... *B60K 25/10* (2013.01); *B60G 17/0157* (2013.01); *B60L 50/30* (2019.02)

(58) Field of Classification Search
CPC .............. B60K 25/10; B60K 2025/103; B60G 17/0157; B60G 2300/50; B60G 2300/60; B60G 13/14; B60G 17/06; B60L 50/30; B60L 53/00; B60Y 2400/20
See application file for complete search history.

(56) References Cited

U.S. PATENT DOCUMENTS

| | | | |
|---|---|---|---|
| 6,952,060 B2 * | 10/2005 | Goldner ............ | B60G 17/0157 310/15 |
| 2007/0284956 A1 * | 12/2007 | Petrovich ................. | H02K 7/06 310/152 |
| 2008/0054745 A1 * | 3/2008 | Sentmanat .......... | A61M 60/546 310/156.01 |

(Continued)

FOREIGN PATENT DOCUMENTS

| | | | | |
|---|---|---|---|---|
| EP | 1510721 A1 * | 3/2005 | ............ | F16F 15/035 |
| EP | 2012042 A1 * | 1/2009 | ............ | B60G 11/15 |
| WO | WO-2022248276 A1 * | 12/2022 | ............ | B60G 13/14 |

OTHER PUBLICATIONS

CN 101801695 A with English translation; date filed Oct. 10, 2008; date published Aug. 11, 2010. (Year: 2010).*

(Continued)

*Primary Examiner* — Calvin Cheung
(74) *Attorney, Agent, or Firm* — Ruben Alcpoba, Esq.

(57) ABSTRACT

A device that converts linear motion into electricity using the exiting movement of a system or equipment such as electric vehicles, motorcycle, or similar equipment. This device can replace the shock absorber of an existing electric vehicle generating electricity that can be used to charge the batteries extending the range of the vehicle. The device is simple an efficient and it comprises of a screw, a plurality of gears used to amplify rotation, a rotor that has magnets, and a stator that allows the coils to produce electricity.

2 Claims, 5 Drawing Sheets

(56) References Cited

U.S. PATENT DOCUMENTS

| | | | | |
|---|---|---|---|---|
| 2008/0277939 A1* | 11/2008 | Richardson | ............ | B60G 9/003 |
| | | | | 320/137 |
| 2009/0026989 A1* | 1/2009 | Kubota | .................. | H02P 25/06 |
| | | | | 318/400.02 |
| 2013/0127175 A1* | 5/2013 | Zuo | ........................ | B60G 13/14 |
| | | | | 290/1 A |
| 2013/0313838 A1* | 11/2013 | Sakamoto | .............. | H02K 35/04 |
| | | | | 290/1 R |
| 2022/0412328 A1* | 12/2022 | Salvaryan | ............... | F03G 7/081 |

OTHER PUBLICATIONS

JP 2008222112 A with English translation; date filed Mar. 14, 2007; date published Sep. 25, 2008. (Year: 2005).*
JP 2007099205 A with English translation; date filed Oct. 7, 2005; date published Apr. 19, 2007. (Year: 2007).*

* cited by examiner

SUSPENSION POWER ELECTRIC GENERATOR

CROSS REFERENCE

This application claims priority to and the benefit under 35 U.S.C. section.119(e) of U.S. Provisional Patent Application No. 63/258,324, filed on Apr. 27, 2021, the entire disclosure of which is hereby incorporated herein by reference.

BACKGROUND

The present invention is directed to a suspension power electric generator that recharges the batteries of an electric vehicle when the electric vehicle is in movement.

The suspension power electric generator of the present invention is made to extend the period between charging of the electric vehicle.

The suspension power electric generator is mounted on an upper and a lower part of an electric vehicle and is made to capture the energy created between the upper and lower parts of the vehicle when the vehicle is in movement.

The present invention uses the mechanical energy that is wasted when an electric vehicle is in motion to create electrical energy.

The present invention provides a device that uses wasted mechanical energy to create electrical energy.

SUMMARY

The present invention is a suspension power electric generator that is mounted on an electric vehicle that converts linear motion into electricity using the exiting movement of the electric vehicle. This invention, when it used in conjunction with a spring system, can replace the shock absorber of an existing electric vehicle. The invention can be used to re-charge the batteries of an electric vehicle while the electric vehicle is in use. By recharging the batteries of the electric vehicle while the vehicle is in use, the range of travel of the electric vehicle is increased. The present invention comprises of a screw, a plurality of gears that are used to amplify rotation, a rotor that has magnets, and a stator that allows a coil system to produce electricity.

An object of the present invention is to provide a device that creates electrical energy from mechanical energy.

Another object of the present invention is to provide a device that can be used to recharge the batteries of an electrical vehicle.

DRAWINGS

These and other features, aspects, and advantages of the present invention will become better understood with regards to the following description, appended claims, and drawings where:

Figure 6:
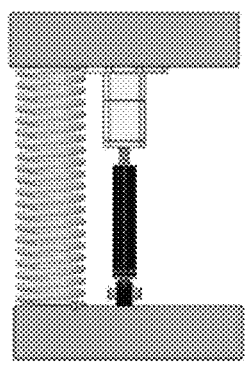
Figure 6:
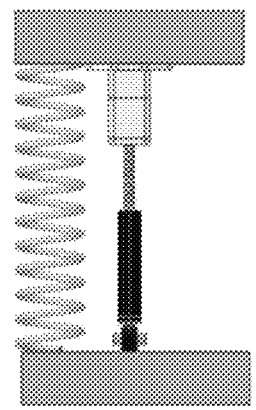
Figure 7:
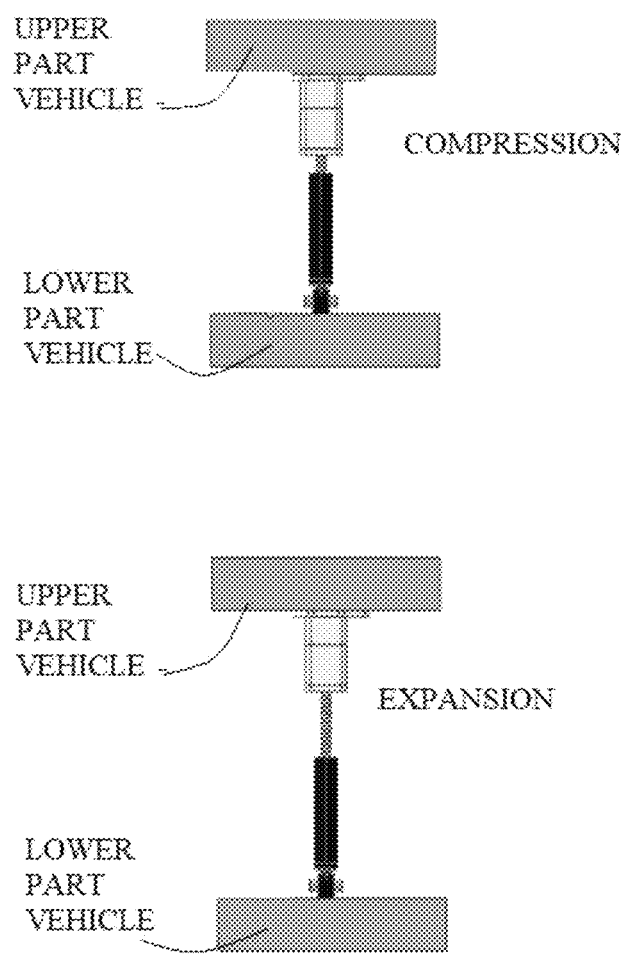

FIG. 6 is a perspective view of the second embodiment showing how that embodiment would be mounted on a vehicle and placed alongside a spring system; and FIG. 7 is an illustration that shows how the present invention generates electricity. When there are two acting forces on object 1 and object 2 pointing towards each other, the device is compressed, hence generating electricity. When there are two forces on object 1 and object 2 pointing away from each other, the device expands, hence generating electricity.

DESCRIPTION

Figure 1:
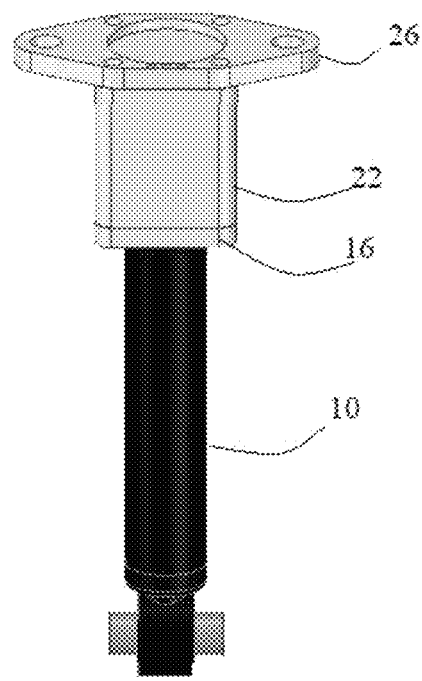
FIG. 1 is a perspective view of a first embodiment of the present invention.
Figure 2:
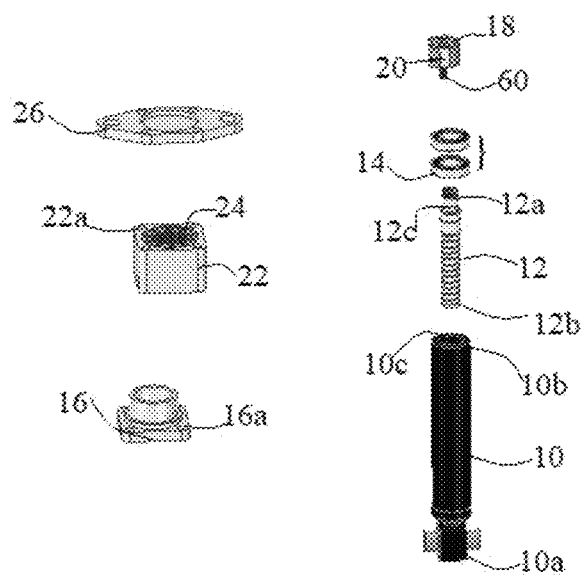
FIG. 2 is an exploded perspective view of the first embodiment.

As seen in FIGS. 1-2, the present invention is a suspension power electric generator that is mounted on an electric vehicle that converts linear motion into electricity. The suspension power electric generator comprises of a nut housing 10 that has a first end 10*a* and a second end 10*b*, the first end 10*a* is configured to be attached to a lower part of a vehicle body using a bracket or a joint that moves in a linear motion and the second end 10*b* defines an inner nut 10*c* that is configured to receive a screw. A screw 12 that has a top side 12*a* and a bottom side 12*b*, the bottom side 12*b* of the screw 12 inserts into the inner nut 10*c* of the nut housing 10, a top outer side 12*c* of the screw defines an outer bearing holder 12*c*. At least one ball bearing 14 that is placed on the outer bearing holder 12*c* of the screw 12. A bearing holder housing 16 that houses the at least one ball bearing 14. A rotor 18 that defines at least four equally spaced magnets 20 on a periphery of the rotor 18, the rotor 18 is attached to the top side of the screw 12*a*. A coil stator housing 22 that has an inner stator 24 that is attached to a top outer side 16*a* of the ball bearing holder 16. And, a coil stator cover 26 that attaches to a top side of the coil stator housing 22*a*, the coil stator cover 26 is configured to attach, to an upper part of a vehicle body.

Figure 4:
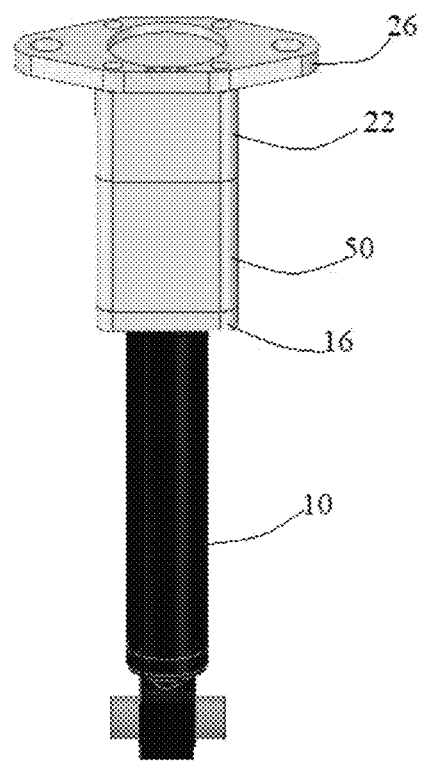
FIG. 4 is a perspective view of a second embodiment of the present invention.
Figure 5:
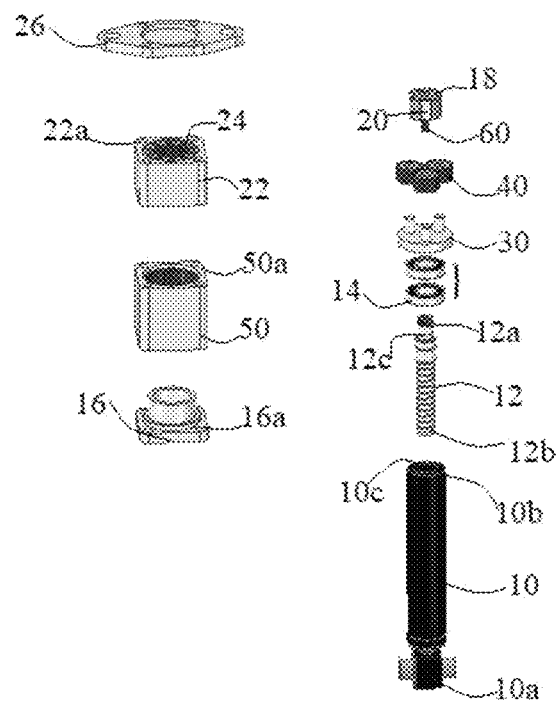
FIG. 5 is an exploded perspective view of the second embodiment.

A seen in FIGS. 4-5, in another embodiment of the invention, the suspension power electric generator 100 comprises of a nut housing 10 that has a first end 10*a* and a second end 10*b*, the first end 10*a* is configured to be attached to a lower part of a vehicle body using a bracket or a joint that moves in a linear motion and the second end 10*b* defines an inner nut 10*c* that is configured to receive a screw. A screw 12 that has a top side 12*a* and a bottom side 12*b*, the bottom side 12*b* of the screw 12 inserts into the inner nut 10*c* of the nut housing 10, a top outer side 12*c* of the screw defines an outer bearing holder 12*c*. At least one ball bearing 14 that is placed on the outer bearing holder 12*c* of the screw 12. A bearing holder housing 16 that houses the at least one ball bearing 14. A planetary carrier 30 that mounts on the top side of the screw 12*a*, the planetary carrier 30 is configured to amplify rotation when working in conjunction with the inner nut 10*c*. At least three planet gears 40 that mount on the planetary carrier 30. A sun gear housing 50 that attaches to a top outer side 16*a* of the bearing holder 16. A sun gear 60 that is inserted between the at least three planet gears 40. A rotor 18 that defines at least four equally spaced magnets 20 on a periphery 18*a* of the rotor 18, the rotor 18 is attached to the sun gear 60. A coil stator housing 22 that has an inner stator 24 that is attached to a top side 50*a* of the sun gear housing. And, a coil stator cover 26 that attaches to a top side 22*a* of the coil stator housing 22, the coil stator cover 26 is configured to attach to an upper part of a vehicle body.

FIG. 5. Show a detail 3-D model showing the internal components of the suspension power generation of the present invention. The nut housing 10 that contains the inner nut 10*c* and a point of contact 10*b* at the bottom. The nut housing 10 and the coils stator cover 26 do not rotate, they only have linear motion. When the nut housing 10 moves linearly, it forces the screw 12 to rotate. The rotation of screw 12 causes the planetary carrier 30 to rotate the planet gears 40 amplifying the gear ration on the sun gear 60, the sun gear is 60 fixed to the rotor 18 that contains the magnets When the rotor 18 rotates, it induces an electricity on the stator 24 housing the coils.

Figure 3:
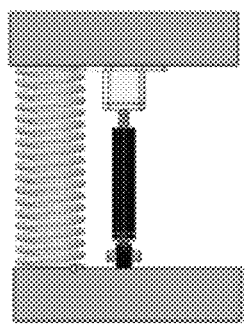
FIG. 3 is a perspective view of the first embodiment showing how that embodiment would be mounted on a vehicle and placed alongside a spring system.
Figure 3:
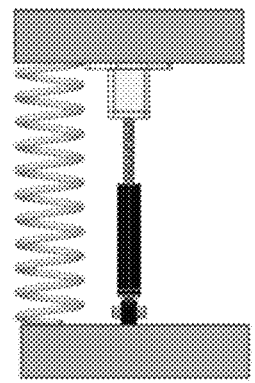

As seen in FIGS. 3 and 6, the present invention is used in in conjunction with a spring system that is placed alongside the present invention. The spring system aids the present invention get from a compression position to an expansion position.

An advantage of the present invention is that it provides a device that create electrical energy from mechanical energy.

Another advantage of the present invention is that it provides a device that can be used to recharge the batteries of an electrical vehicle.

While the inventor's description contains many specificities, these should not be construed as limitations on the scope, but rather as an exemplification of several preferred embodiments thereof. Many other variations are possible. Accordingly, the scope should be determined not by the embodiments illustrated, but by the specification, the drawings, and the appended claims and their legal equivalents.

What is claimed is:

1. A suspension power electric generator that is mounted on an electric vehicle that converts linear motion into electricity, the suspension power electric generator comprises:
    a nut housing that has a first and a second end, the first end is configured to be attached to a lower part of a vehicle body using a bracket or a joint that moves in a linear motion and the second end defines an inner nut that is configured to receive a screw;
    a screw that has a top and a bottom side, the bottom side of the screw inserts into the inner nut of the nut housing, a top outer side of the screw defines an outer bearing holder;
    at least one ball bearing that is placed on the outer bearing holder of the screw;
    a bearing holder housing that houses the at least one ball bearing a rotor that defines at least four equally spaced magnets on a periphery of the rotor, the rotor is attached to the top side of the screw;
    a coil stator housing that has an inner stator that is attached to a top outer side of the ball bearing holder; and
    coil stator cover that attaches to a top side of the coil stator housing, the coil stator cover is configured to attach to an upper part of a vehicle body.

2. A suspension power electric generator that is mounted on an electric vehicle that converts linear motion into electricity, the suspension power electric generator comprises:
    a nut housing that has a first and a second end, the first end is configured to be attached to a lower part of a vehicle body using a bracket or a joint that moves in a linear motion and the second end defines an inner nut that is configured to receive a screw;
    a screw that has a top and a bottom side, the bottom side of the screw inserts into the inner nut of the nut housing, a top outer side of the screw defines an outer bearing holder;
    at least one ball bearing that is placed on the outer bearing holder of the screw;
    a bearing holder housing that houses the at least one ball bearing;
    a planetary carrier that mounts on the top side of the screw, the planetary carrier is configured to amplify rotation when working in conjunction with the inner nut;
    at least three planet gears that mount on the planetary carrier;
    a sun gear housing that attaches to a top outer side of the bearing holder;
    a sun gear that is inserted between the at least three planet gears;
    a rotor that defines at least four equally spaced magnets on a periphery of the rotor, the rotor is attached to the sun gear;
    a coil stator housing that has an inner stator that is attached to a top side of the sun gear housing; and
    coil stator cover that attaches to a top side of the coil stator housing, the coil stator cover is configured to attach to an upper part of a vehicle body.

* * * * *